United States Patent
Steinhafel et al.

(10) Patent No.: US 8,367,163 B2
(45) Date of Patent: Feb. 5, 2013

(54) ENAMEL FLOW COATING PROCESS AND APPARATUS

(75) Inventors: Michael B. Steinhafel, Madison, WI (US); Mutubwa K. Kahite, Madison, WI (US); Peter J. Davis, Albany, WI (US); Mark L. Kallas, Princeton, WI (US); Randall E. Malson, Berlin, WI (US); Edward A. Goehring, Wisconsin Rapids, WI (US)

(73) Assignee: Bock Water Heaters, Inc., Madison, WI (US)

( * ) Notice: Subject to any disclaimer, the term of this patent is extended or adjusted under 35 U.S.C. 154(b) by 1156 days.

(21) Appl. No.: 12/244,114

(22) Filed: Oct. 2, 2008

(65) Prior Publication Data

US 2010/0086695 A1 Apr. 8, 2010

(51) Int. Cl.
*B05D 1/18* (2006.01)

(52) U.S. Cl. ....... 427/430.1; 427/346; 118/56; 118/400; 118/409; 118/501; 118/612

(58) Field of Classification Search .................. 427/346, 427/430.1; 118/56, 400, 409, 501, 612
See application file for complete search history.

(56) References Cited

U.S. PATENT DOCUMENTS

| | | | |
|---|---|---|---|
| 1,689,062 A * | 10/1928 | Titchener | 427/336 |
| 2,445,451 A * | 7/1948 | Padelford | 118/642 |
| 3,871,440 A | 3/1975 | Horton | |
| 3,982,050 A | 9/1976 | Kato et al. | |
| 4,273,811 A | 6/1981 | Okamoto et al. | |
| 4,848,603 A * | 7/1989 | Kubota et al. | 222/595 |
| 5,120,410 A | 6/1992 | Herdzina, Jr. | |
| 5,199,189 A * | 4/1993 | Bourgoine et al. | 34/186 |
| 5,336,523 A | 8/1994 | Chater et al. | |
| 5,417,829 A | 5/1995 | Zecher | |
| 6,174,490 B1 * | 1/2001 | Brinkman et al. | 264/629 |
| 6,354,248 B1 | 3/2002 | Bourke | |
| 6,419,983 B1 | 7/2002 | Kreuzer | |
| 7,090,892 B2 | 8/2006 | Becker et al. | |
| 7,105,198 B2 * | 9/2006 | Sundar | 427/2.24 |
| 2003/0082306 A1 | 5/2003 | Waters et al. | |
| 2004/0202793 A1 * | 10/2004 | Harper et al. | 427/430.1 |
| 2005/0183662 A1 | 8/2005 | Ehrenleitner | |
| 2005/0217574 A1 | 10/2005 | Amador et al. | |
| 2005/0235984 A1 * | 10/2005 | Trihey et al. | 126/615 |

* cited by examiner

Primary Examiner — Robert S Walters, Jr.
(74) Attorney, Agent, or Firm — Stiennon & Stiennon

(57) ABSTRACT

An enamel flow coating process and apparatus is arranged as a four arm Ferris wheel like apparatus which is mounted over a bathtub like tank which holds enamel slip. Coils of steel tubing formed into heat exchangers are mounted to the arms of the wheel to rotate and to pivot. The wheel is rotated between four stations. In the first station, a coil is loaded onto the wheel. In a second station the coil is pivoted into the tank of enamel slip, where it is coated, and withdrawn by operation of a pivoting bracket. The coated coils are rotated through third and fourth stations where the coating solidifies, and the coated heat exchanger is removed, and replaced with an uncoated one in the first station. After leaving the wheel, the heat exchanger is fired and installed in a water storage tank.

13 Claims, 3 Drawing Sheets

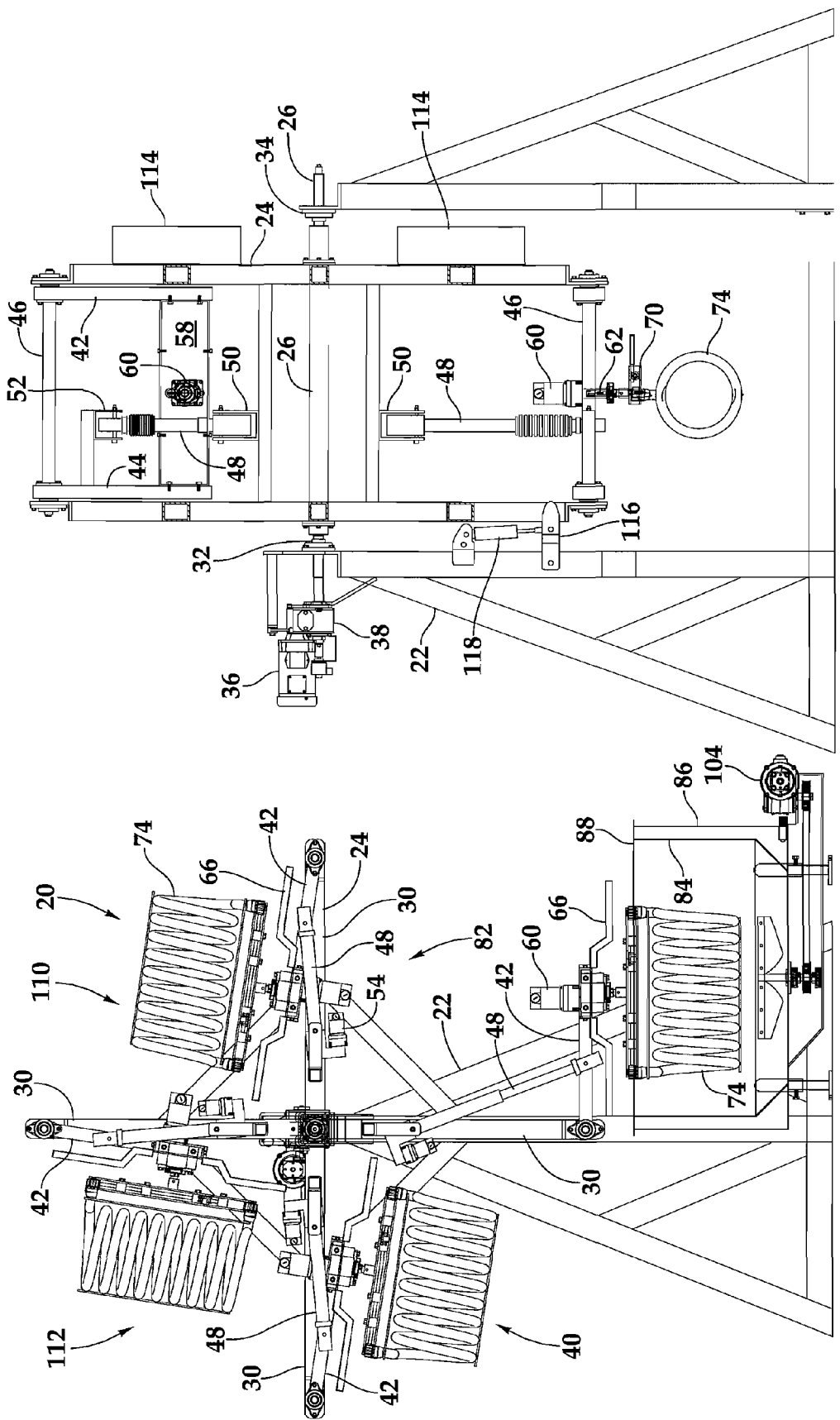

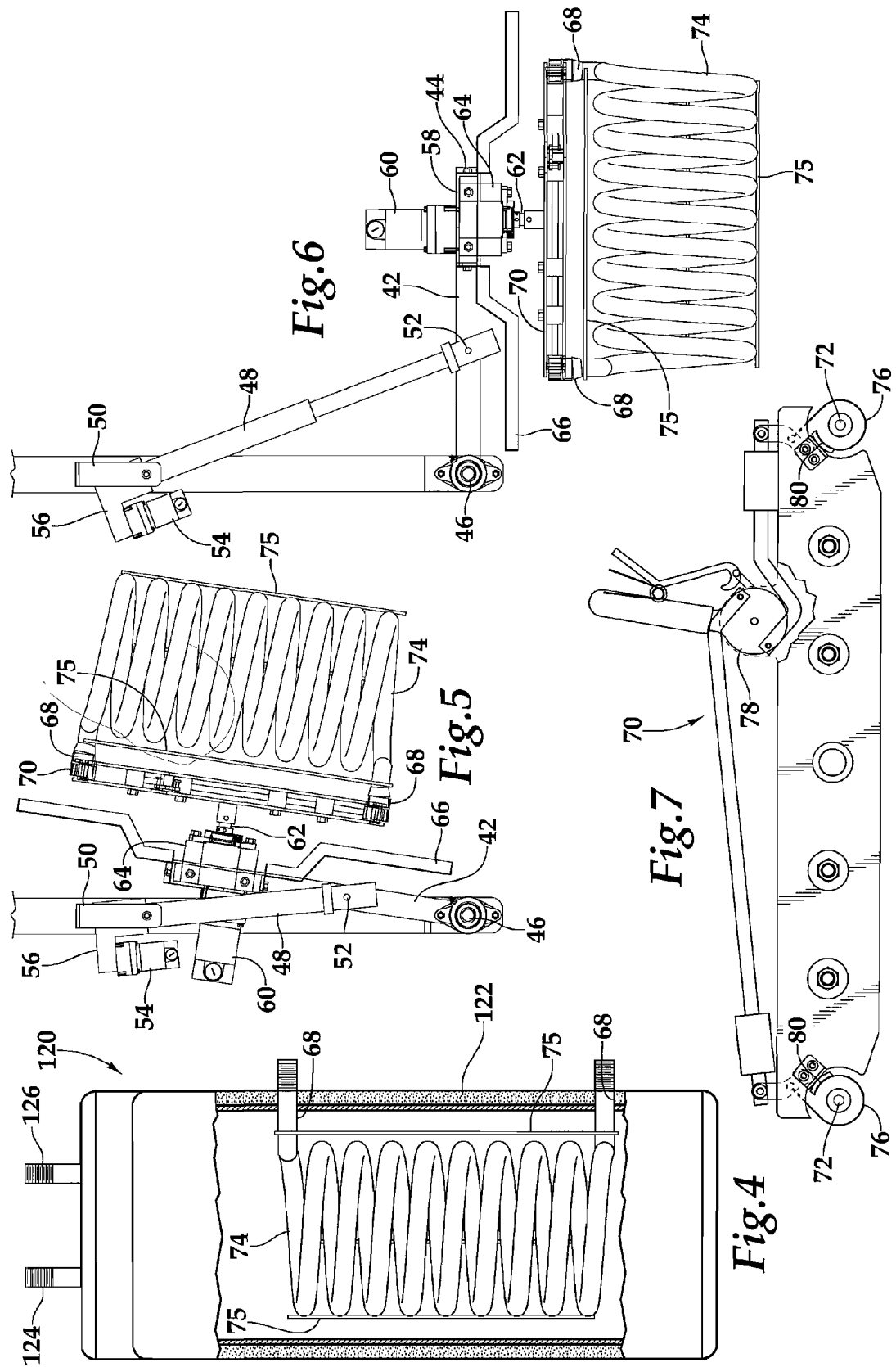

ENAMEL FLOW COATING PROCESS AND APPARATUS

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to methods of applying water resistant coatings to a heat exchanger coil in general, and in particular to methods of applying porcelain ceramic coatings to mild steel heat exchanger tubes, and the equipment for effecting such coatings.

Hot water is used domestically for bathing, cleaning and heating, and commercially for similar purposes. In domestic and commercial water heating, water is normally heated in a water tank with a central flue extending upwardly from a combustion chamber located beneath the water tank. The water in the tank is heated through thermal conduction from the tank bottom and the central flue. There are, however, many circumstances in which it is desirable to heat water indirectly in a storage tank. For example heat from a boiler which heats recirculating water for domestic or commercial space heating, can be used to heat water in a so called indirect-fired water heater. In an indirect-fired water heater or storage tank, a heat exchanging coil is positioned within the water tank and hot water from the boiler or other source is circulated through the heat exchanging coil. Another source of heat for domestic hot water is that of a solar thermal system which stores heat gathered from the sun. These systems also require water storage tanks which can be heated indirectly by means of a heat exchange coil. Geothermal systems also require storage of heat recovered from geothermal reservoirs, and thus make use of water storage tanks with heat exchanging coils.

Domestic hot water appliances are typically manufactured from mild steel and are protected from potable water—which may contain dissolved oxygen—by a glass or enamel coating. The coating is applied as a slip i.e., a water and ceramic slurry, which is dried and then fired to form a glass coating which protects the metal of the tank from corrosion and oxidation. Secondary protection is often provided by sacrificial anodes of, for example, magnesium.

A coating is typically applied to heat exchanger coils by spraying the coil. This method, however, involves considerable labor, results in over spraying of the coating, and lacks uniformity in the applied coating. What is needed is an automated system to uniformly coat water storage heat exchanging coils which minimizes cost and waste.

SUMMARY OF THE INVENTION

The enamel flow coating process and apparatus of this invention comprises a four arm Ferris wheel like apparatus which is mounted over a bathtub like tank which holds enamel slip. The wheel of the apparatus is mounted to a stand for rotation about a horizontal axis. The apparatus has four stations separated by 90° of rotation of the wheel through which each of the four arms of the wheel moves. One station is located over the bathtub like tank. A heat exchanger coil mounting bracket is pivotally mounted to each arm of the wheel. Each coil mounting bracket is pivotally mounted like a door which is hinged to an outer portion of the arm and swings from a position which is nearly closed so as to lie within 10-15 degrees of the plane defined by the arm, to an open position of about 90° to the plane. A linear actuator is mounted between the arm and the coil mounting bracket, and is arranged to cause the coil mounting bracket to pivot from the nearly closed position to the open position which is substantially at right angles to the plane defined by the arm. A motor for rotating a heat exchanger coil is mounted to the coil mounting bracket, and has a drive shaft which rotates about an axis which is perpendicular to the coil mounting bracket. A heat exchanger coil clamp is mounted to the driveshaft for mounting a heat exchanger coil for rotation on the driveshaft.

In operation, in a first station, heat exchanger coils formed of steel tubing are attached to the motor driveshaft by a coil clamp. The wheel of the enameling apparatus is then rotated 90° so that the coil passes to a second station positioned over the tank holding enamel slip. The linear actuator is then actuated to pivot the coil mounting bracket and thus to submerge the exchanger coil in the slip contained in the tank. After the heat exchanger coil is coated by immersion, the coil mounting bracket is retracted to remove the heat exchanger from the tank. The motor mounted to the coil mounting bracket is activated to begin rotation of the heat exchanger coil to keep the slip uniformly distributed on the coils of the heat exchanger. As the enameled coil is transported through a third and fourth station the rotation is continued as the orientation of the coil is changed by the rotation of the wheel. By the time the coil again reaches the first station, the enamel slip has set, and the coil is removed from the enameling apparatus and replaced with an uncoated coil. Coated coils are fired to form a glass enamel coating which protects the exterior of the coil from corrosion.

It is an object of the present invention to provide an apparatus for uniformly and cost-effectively coating steel coils with a glass or enamel coating.

It is another object of the present invention to provide a method for uniformly and cost-effectively coating heat exchanger coils with an enamel slip.

It is a further object of the present invention to provide an apparatus to more cost-effectively, rapidly, and uniformly coat heat exchanger coils with enamel slip.

Further objects, features and advantages of the invention will be apparent from the following detailed description when taken in conjunction with the accompanying drawings.

BRIEF DESCRIPTION OF THE DRAWINGS

FIG. 1 is a side elevational view of the enameling apparatus of this invention.

FIG. 2 is a front elevational schematic view of the enameling apparatus of FIG. 1.

FIG. 4 is a front elevational view, partially cutaway in section, of a typical heat exchanger coil installed in a water tank.

FIG. 5 is a side elevational view of a single arm of the wheel of the enameling apparatus of FIG. 1 showing the coil mounting bracket with heat exchanger coil mounted thereto in a retracted position.

FIG. 6 is a side elevational view of the arm of FIG. 5 showing the coil mounting bracket with heat exchanger mounted thereto in an extended position in which the coil is dipped into an enameling tank.

FIG. 7 is a side elevational view of a heat exchanger coil clamp which operates to clamp the exchanger coil to a rotating shaft of a motor fixed to the coil mounting bracket.

DESCRIPTION OF THE PREFERRED EMBODIMENTS

Figure 3:
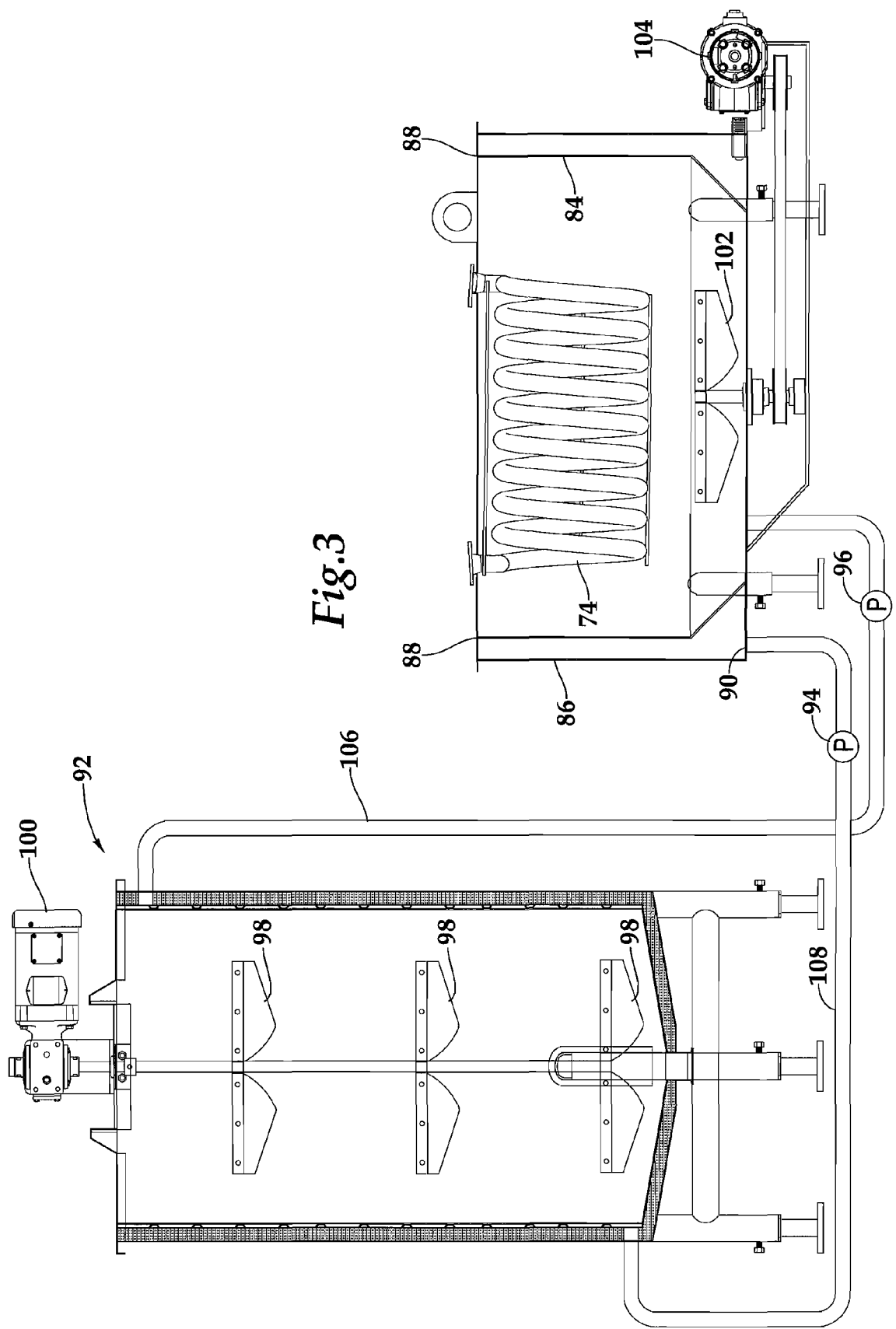
FIG. 3 is a schematic side elevational cutaway view of the enamel slip conditioning system used with the apparatus of FIG. 1.

Referring more particularly to FIGS. 1-7, wherein like numbers refer to similar parts, an enameling apparatus 20 is shown in FIG. 1. The enameling apparatus 20 comprises a stand, or frame 22 which supports a wheel 24 which is mounted for rotation about a horizontal shaft 26 which is supported on the stand, as shown in FIG. 2. The wheel 24 has four identical arms 30 arranged in a cruciform pattern. Each arm extends radially from the horizontal shaft 26. The shaft 26 is supported on the stand 22 between a drive side bearing 32 and a non-drive side bearing 34. The wheel 24 is caused to rotate by a motor 36 mounted to the stand 22. The motor 36 connects to the shaft 26 through a gearbox 38 and thereby rotates the wheel 24 so as to move the arms 30 between four stations defined by the four Cartesian quadrants of the cruciform shape of the wheel 24 as illustrated in FIG. 1. The first station or loading station 40 is in the lower left-hand quadrant of FIG. 1.

Each arm of the wheel has a pivotally mounted coil support bracket 42 which receives a coil to be coated in the first station. Each coil support bracket 42, as best shown in FIGS. 2, 5, and 6, is comprised of a frame 44 which is pivotally mounted to a shaft 46 at the radially outwardmost end of one of the arms 30. The shafts 46 are parallel to the wheel shaft 26, and each bracket frame 44 swings on the shaft 46 like a gate or door from a substantially closed position of about 10° to 15° from a plane defined by an arm 30, as shown in FIG. 5, to an open position at approximately 90° to the plane defined by the arm, as shown in FIG. 6. The bracket frame 44 total swing on the shaft 46 may be as much as 90° but more typically 50° to 80°. A linear actuator 48 extends between a first actuator bracket 50 on the arm 30 and a second actuator bracket 52 on the coil support bracket 42 as best shown in FIGS. 2 and 5. The linear actuator 48 is an electrical actuator driven by a motor 54 through a gearbox 56 which drives the coil support bracket 42 between the two positions as shown in FIGS. 5, and 6. As shown in FIG. 2, the coil support bracket frame 44 supports a crossbeam 58 which supports an electric motor 60. As shown in FIG. 5, the motor turns a shaft 62 through a gearbox 64. The shaft 62 lies in a plane perpendicular with respect to the wheel shaft 26 and is perpendicular to the shaft 46, of the support bracket 42. As shown in FIG. 6, the shaft 62 extends through a drip guard 66 which is mounted to the crossbeam 58 of the coil support bracket 42. The drip guard 66 shields the components of the enameling apparatus, reducing the amount of enameling slip which accumulates on the apparatus 20 and which might otherwise drip from one heat exchanger coil to another.

In the first or loading station 40, the ends 68 of a heat exchanger coil 74 are attached to the motor shaft 62 by a coil clamp 70 shown in FIG. 7. The coil clamp has two posts 72 which fit into the ends 68 of the coil 74, and metal straps 76 are tightened by an over center mechanism 78 around the exterior of the coil ends 68, clamping them against pads 80 mounted to the coil clamp 70. For ease of loading, the exchanger coils 74 are preferably loaded with the coil support bracket 42 in the extended position such that the axis of the coil is approximately vertical when loaded. The support bracket 42 is then retracted to the position shown in FIG. 1 and the wheel 24 is rotated 90° counterclockwise to bring the just loaded coil 74 into a second station 82 located in the lower right quadrant of the cruciform wheel 24.

An upwardly opening dipping tank 84 is located in the second station 82, and is positioned and dimensioned such that a heat exchanger coil 74 mounted to the coil support bracket 42 in the second station 82 will be dipped into the tank when the linear actuator 48 is extended. An outer shell 86 surrounds the tank 84 and forms a return path for enamel slip. Slip is constantly supplied to the dipping tank 84 and overflows the upper edges 88 of the tank walls and, as shown in FIG. 3, passes down to a sump 90 where the overflow enamel slip is sent by a return pump 94 back to a storage and mixing vessel 92. Slip is constantly supplied from the storage tank 92 by a supply pump 96 to the tank 84 so that the tank is filled to overflowing. The storage tank 92 may be surrounded by a cooling jacket so that the temperature of the enamel slip in the storage tank and in the dip tank 84 can be regulated. When the coil 74 is dipped into the tank 84, a consistent level of the liquid is assured by the weir like action of the upper edges 88 of the dipping tank walls so that the entire coil is consistently coated.

The slip coating is, for example, of the type described in US publication number US 2003/0082306. published May 1, 2003, and assigned to AOS Holding Company of Wilmington Del. This type of porcelain enamel coating is prepared as a water suspension of borosilicate glass milled silica and zirconia compounds. The enamel slip is thixotropic, and so remains fluid as long as it is subject to mechanical shearing, but forms a gel like solid when left to settle for a short time. To prevent jelling of the enamel slip it is kept constantly agitated in the storage and mixing vessel 92 by an arrangement of mixing paddles 98 which are constantly driven by a motor 100. Similarly, within the dipping tank 84 a paddle 102, driven by a motor 104 is arranged to keep the slip in constant motion. The action of the return pump 94 and supply pump 96 keep the slip in constant motion through the supply and return lines 106, and 108. The return pump 94 and the supply pump 96 are selected from the type of pumps designed to handle highly abrasive slurries.

When the coil 74 is withdrawn from the dipping tank 84, by retracting the linear actuator 48, the enamel slip remains fluid for a while and so will tend to drain from the uppermost portions of the coil and lower portions. To prevent this, the coil is rotated at about 6 rpm on the motor shaft 62 which is mounted to the coil support bracket 42. The coil 74 is continuously rotated as it is moved through a third station 110, and a fourth station 112 where the coating solidifies, and finally it is brought to a stop in the first station 40 where the coil is removed and transferred to the enameling furnace where the slip coating is fired to produce a water-resistant glass coating. Following the removal of a coated coil 74, a new uncoated coil is installed and the process of dip coating is repeated. The coating thickness is controlled by maintaining a set slump and specific gravity in the circulating enamel slip. The wheel 24 rotates between stations of 90° approximately every 150 seconds such that a complete rotation is completed every 10 minutes, and coated heat exchanger coils 74 are produced at a rate of about 24 an hour. To ensure precise positioning of the wheel 24 with respect to the second station 82, a bracket 116, as shown in FIG. 2, is pivoted downward by an actuator 118 to lock the wheel 24 against rotation while the dipping operation takes place. After the heating coil 74 in the second station 82 has been dipped in the upwardly opening tank 84 and removed from the tank, the actuator 118 retracts the bracket 116 allowing the wheel 24 to be rotated to the next station.

Control of the enameling apparatus 20 is accomplished with an onboard programmable controller mounted in control boxes 114 on the wheel 24, and an external controller (not shown) which communicates with the programmable controllers which rotate with the wheel 24. Communication is accomplished through a data commutator mounted on one end of the horizontal shaft 26, or with a Bluetooth® type or other wireless data link. The motors 54 which drive the linear actuators 48, and the motors 60 which rotate the heat exchanger coils 74 are driven with electricity passed to the rotating wheel 24 through an electric commutator (not shown) mounted to the non-drive-side of the shaft 26. Sensors may be used for closed loop control. For example, sensors may be used to detect the rotation of the wheel 24 on the horizontal shaft 26. Additionally, sensors can be positioned above the bracket 116 which locks the wheel 24, to detect the presence of an arm 30 within the confines of the bracket 116. Sensors may also be used to detect the level of slip in the upwardly opening tank 84. Generally feedback can be added to each motor or actuator to provide feedback to the system controller (not shown) if needed.

The heat exchanger coils 74 are typically formed of 1½ inch or 2 or 2½ inch OD diameter mild steel tube with 16 gage walls i.e., 0.0598 inch wall thickness. A typical heat exchanger coil as illustrated in the drawings has a 1½ inch diameter coil approximately 14 inches in diameter and 25 inches long with nine coils. The heat exchanger coil will typically have a minimum of six coils and a tube diameter of between 1-3 inches. The coils 74 are typically stabilized and stiffened with four metal rods 75, as shown, for example, in FIG. 3, which prevent vibration during transportation or as a result of water hammer during use. The metal rods also provide a convenient mounting position for hooks or washers (not shown) for supporting the coil 74 during firing. Completed heat exchanger coils 74 are installed as illustrated in FIG. 4 in a hot water storage tank 120, which is surrounded by insulation 122 and has a water inlet 124 and a water outlet 126. In operation heat is supplied to the storage tank by circulating hot water through the heat exchanger coil 74 which heats the water within the storage tank. Water to be heated is supplied to the water inlet and heated water is withdrawn from the water outlet.

It should be understood that the number of arms 30 and corresponding stations could be other than the illustrated four. It will also be understood that wherein actuators of a particular type are illustrated and described, similar actuators accomplishing the same function may be used.

It will also be understood that the rate of rotation of the wheel 24, and the shafts 62 on which the heating coils 74 are mounted may be varied depending on the size of the coils, the type and thickness of the coating and the desired production rate.

It should also be understood that once the heat exchanger coil 74 is rotated clear of the dipping tank 84, the angular position of the coil support brackets 42 with respect to the arms 30, and the rate of rotation of the electric motors 60 are free variables which can be adjusted to obtain uniformity of the enamel coating on the outer surface of the heat exchanger coil.

It is understood that the invention is not limited to the particular construction and arrangement of parts herein illustrated and described, but embraces all such modified forms thereof as come within the scope of the following claims.

We claim:

1. A method of applying enamel slip to a heat exchanger coil comprising the steps of:
    mounting a heat exchanger coil on a rotatable shaft;
    while the heat exchanger coil is mounted to the rotatable shaft using an actuator to pivot the heat exchanger coil from a first position wherein the heat exchanger coil is not contained in an upwardly opening container of enamel slip, to a second position wherein the heat exchanger coil is substantially submerged in enamel slip contained in the upwardly opening container of the enamel slip to coat the heat exchanger coil with enamel slip;
    using the actuator to pivot the heat exchanger coil from the second position to a position where the heat exchanger coil is removed from the enamel slip and free to rotate on the rotatable shaft;
    after the heat exchanger coil is removed from the enamel slip initiating driving the rotatable shaft and causing the heat exchanger coil mounted thereto to rotate; and
    continuing to rotate the heat exchanger coil until the coating slip coating the heat exchanger coil is no longer liquid.

2. The method of claim 1 wherein the step of mounting a heat exchanger coil on the rotatable shaft includes mounting the heat exchanger coil to the rotatable shaft in a first station of a wheel mounted for rotation on a frame, and further comprising the steps of:
    rotating the wheel from the first station to a second station positioned above the upwardly opening container of enamel slip, and pivoting a bracket to which the rotatable shaft is mounted with a linear actuator to accomplish the step of coating the heat exchanger coil with enamel slip;
    rotating the wheel while performing the step of continuing to rotate the heat exchanger coil until the coating slip coating the heat exchanger coil is no longer liquid; and
    returning the heat exchanger coil to the first station, and replacing it with an uncoated heat exchanger coil.

3. The method of claim 1 wherein the step of using an actuator to pivot the heat exchanger coil from a first position wherein the heat exchanger coil is not contained in an upwardly opening container of enamel slip, to a second position wherein the heat exchanger coil is substantially submerged in enamel slip is performed by a linear actuator.

4. A method of applying enamel slip to a heat exchanger coil comprising the steps of:
    mounting a heat exchanger coil on a rotatable shaft;
    while the heat exchanger coil is mounted to the rotatable shaft using a linear actuator to pivot the heat exchanger coil from a first position wherein the heat exchanger coil is not contained in an upwardly opening container of enamel slip, to a second position wherein the heat exchanger coil is substantially submerged in enamel slip contained in the upwardly opening container of the enamel slip to coat the heat exchanger coil with enamel slip;
    using the linear actuator to pivot the heat exchanger coil from the second position to a position where the heat exchanger coil is removed from the enamel slip and free to rotate on the rotatable shaft;
    driving the rotatable shaft and causing the heat exchanger coil mounted thereto to rotate; and
    continuing to rotate the heat exchanger coil until the coating slip coating the heat exchanger coil is no longer liquid;
    further comprising the step of while rotating the heat exchanger coil on the rotatable shaft, simultaneously rotating the heat exchanger coil about a second axis perpendicular to the rotatable shaft.

5. A method of applying a coating to the exterior of a heat exchanger coil of the type used in a hot water storage tank, comprising the steps of:
    mounting a heat exchanger coil in a first station to a clamp on a rotatable shaft mounted to a support bracket pivotally mounted on an arm forming a part of a wheel, the wheel being mounted for rotation about a horizontal axis on a frame;

rotating the wheel about the horizontal axis to a second station which positions the heat exchanger coil above an upwardly opening tank mounted beneath the wheel, and locking the wheel against rotation;

maintaining within the upwardly opening tank a quantity of enamel slip at a fixed level within the tank;

stirring the quantity of enamel slip within the upwardly opening tank with a rotating paddle;

operating an actuator arranged between the support bracket and the arm to pivot the support bracket, the rotatable shaft mounted to the support bracket, and the heat exchanger coil clamped to the rotatable shaft until the heat exchanger coil is substantially submerged in the enamel slip;

operating the actuator until the heat exchanger coil is clear of the upwardly opening tank, followed by beginning rotating the heat exchanger coil on the rotatable shaft, and unlocking the wheel so it is free to rotate;

rotating the wheel to a third station while collecting slip dripping from the heat exchanger coil with a drip guard which is positioned beneath the heat exchanger coil in the third station; and continuing to rotate the heat exchanger coil until a coating slip coating the heat exchanger coil is no longer liquid.

6. The method of claim 5 wherein the step of operating the actuator arranged between the support bracket and the arm to pivot the support bracket actuator pivots said support bracket over an angle of about 50° to 90°.

7. The method of claim 5 wherein the step of maintaining within the upwardly opening tank the quantity of enamel slip at the fixed level within the tank is by an overflow weir at the fixed level.

8. The method of claim 7 wherein enamel slip is supplied to the upwardly opening tank from a holding tank in which enamel slip is continuously stirred, and enamel slip is returned from the upwardly opening tank to the holding tank by passing over the weir.

9. The method of claim 5 wherein the steps of operating an actuator arranged between the support bracket and the arm to pivot the support bracket until the heat exchanger coil is substantially submerged in the enamel slip, and operating the actuator until the heat exchanger coil is clear of the upwardly opening tank are performed with a linear actuator.

10. A method of applying a coating to the exterior of a heat exchanger coil of the type used in a hot water storage tank formed of a steel tube 1 to 3 inches in diameter having at least six complete coils, the heat exchanger coil having two open ends, the method comprising the steps of:

mounting the heat exchanger coil to a clamp by the open ends on a rotatable shaft mounted to a support bracket pivotally mounted on an arm forming a part a wheel, the wheel being mounted for rotation about a horizontal axis on a frame;

rotating the wheel about the horizontal axis to a position where the heat exchanger coil is above an upwardly opening tank mounted beneath the wheel;

maintaining within the upwardly opening tank a quantity of enamel slip;

extending a linear actuator arranged between the support bracket and the arm to pivot the support bracket, the rotatable shaft mounted to the bracket, and the heat exchanger coil clamped to the rotatable shaft, until the heat exchanger coil and the at least six complete coils are substantially submerged in the enamel slip;

retracting the linear actuator until the heat exchanger coil is clear of the upwardly opening tank, followed by beginning rotating the heat exchanger coil on the rotatable shaft;

rotating the wheel; and continuing to rotate the heat exchanger coil until a coating slip coating the heat exchanger coil is no longer liquid.

11. The method of claim 10 wherein the wheel forms a cruciform shape composed of four arms extending radially outwardly from the horizontal axis, wherein the wheel rotates between a first station, to a second station, to a third station to a fourth station and back to the first station, wherein a coated heat exchanger coil is removed and replaced with an uncoated heat exchanger coil in the first station; and in the second station the uncoated heat exchanger coil is coated with enamel slip.

12. The method of claim 10 wherein the heat exchanger coil has an exterior to which the coating is applied and after coating the heat exchanger coil is fired to form a glass enamel coating which protects the exterior of the heat exchanger coil from corrosion.

13. The method of claim 10 wherein the upwardly opening tank has portions defining a weir which maintains a constant level of coating liquid in the tank.

\* \* \* \* \*